US007015260B2

(12) United States Patent
Meloni

(10) Patent No.: US 7,015,260 B2
(45) Date of Patent: Mar. 21, 2006

(54) HIGH TEMPERATURE POLYMERIC MATERIALS CONTAINING CORONA RESISTANT COMPOSITE FILLER, AND METHODS RELATING THERETO

(75) Inventor: Paul Arthur Meloni, League City, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 188 days.

(21) Appl. No.: 10/454,359

(22) Filed: Jun. 4, 2003

(65) Prior Publication Data

US 2004/0249041 A1 Dec. 9, 2004

(51) Int. Cl.
*C08K 9/06* (2006.01)

(52) U.S. Cl. ............. 523/200; 523/212; 523/333; 524/261; 524/381; 524/382

(58) Field of Classification Search ............. 523/212, 523/200, 333; 524/261, 381, 382
See application file for complete search history.

(56) References Cited

U.S. PATENT DOCUMENTS

| | | | |
|---|---|---|---|
| 3,496,139 A | | 2/1970 | Markovitz |
| 3,519,670 A | | 7/1970 | Markovitz |
| 4,308,312 A | | 12/1981 | Urban |
| 4,544,359 A | * | 10/1985 | Waknine ............... 522/14 |
| 4,546,041 A | * | 10/1985 | Keane et al. ............... 428/372 |
| 4,547,531 A | * | 10/1985 | Waknine ............... 523/116 |
| 4,759,987 A | * | 7/1988 | Mizobe et al. ............... 428/395 |
| 4,760,296 A | | 7/1988 | Johnston et al. |
| 5,989,706 A | | 11/1999 | McGinniss et al. |
| 6,060,162 A | * | 5/2000 | Yin et al. ............... 428/372 |
| 6,075,303 A | | 6/2000 | Schuler |
| 6,500,883 B1 | | 12/2002 | Mack et al. |
| 2002/0007959 A1 | * | 1/2002 | Kaltenborn et al. .... 174/137 B |
| 2004/0249019 A1 | * | 12/2004 | Meyer et al. ............... 523/200 |

FOREIGN PATENT DOCUMENTS

| | | |
|---|---|---|
| EP | 0 487 640 B1 | 3/1997 |
| EP | 0790623 A1 * | 8/1997 |
| EP | 0 790 623 B1 | 9/1999 |
| GB | 2 296 915 A1 | 7/1996 |
| JP | 56-38006 | 9/1981 |
| JP | 61-42401 | 9/1986 |
| JP | 01-0035588 | 7/1989 |
| JP | 02-240901 | 9/1990 |
| JP | 04-67511 | 3/1992 |
| JP | 04-207940 | 7/1992 |
| WO | WO 97/38041 A1 | 10/1997 |

OTHER PUBLICATIONS

Derwent ACC-No.: 1998-569716, abstract for DE 19717645-A1.*
Derwent ACC-No.: 2003-203970, abstract for JP 2002/294075-A.*

* cited by examiner

*Primary Examiner*—Matthew A. Thexton

(57) ABSTRACT

Corona resistant, high temperature polymeric materials are disclosed which are generally useful in high voltage wire insulation or similar type applications. The materials contain composite fillers having an organic component with excellent dispersion properties in certain organic solvents, depending upon the particular embodiment selected, and an inorganic ceramic oxide component generally having excellent corona resistance properties.

19 Claims, No Drawings

US 7,015,260 B2

HIGH TEMPERATURE POLYMERIC MATERIALS CONTAINING CORONA RESISTANT COMPOSITE FILLER, AND METHODS RELATING THERETO

FIELD OF THE INVENTION

The present invention is directed to highly filled, corona resistant polymeric materials useful for coating high voltage wire and similar-type applications. More specifically, the polymeric materials of the present invention comprise a composite filler material having an inorganic ceramic oxide component and an organic component, where the two composite filler components are bridged together, at least in part, by an organosiloxane or organo-metaloxane type moiety.

BACKGROUND OF THE INVENTION

Ceramic oxide particles, particularly silica, alumina, titania, and zirconia are known to have corona resistance properties. Sub-micron alumina is often used commercially in such (corona resistance) applications.

U.S. Pat. No. 4,308,312 to Urban teaches improved corona resistance using a film coating comprising alumina particles of a type "which provide a suspension which has an acid pH when the particles are slurried in distilled water."

U.S. Pat. No. 4,760,296 to Johnston et al. teaches the use of unmodified ceramic oxide particles, organosilicates, or organoaluminates as wire insulation (corona resistant) filler and distinguishes these composite fillers from organosiloxane derivatives.

Numerous temperature-resistant polymers, including polyimides, polyetherketones, polyethersulfones and polyphthalamides, have been considered for use as high voltage wire insulation. However, ceramic oxide fillers can be difficult, if not impractical or impossible, to efficiently and economically disperse into such polymers in sufficient quantities to achieve optimal desired corona resistance.

An ineffective dispersion of (corona resistant) composite filler can result in inadequate corona resistance and/or diminished mechanical properties. A need therefore exists for a temperature resistant polymeric composition (for wire coatings or similar type applications) having excellent corona resistance and/or mechanical properties.

SUMMARY OF THE INVENTION

The present invention is directed to high temperature polymeric materials useful for wire wrap type applications, including polymeric materials comprising at least 50, 60, 70, 75, 80, 85, 90, 95, 96, 97, 98, 99 or 100 weight percent high temperature polymers, such as, polyimide, polyetherketone, polyethersulfone polyphthalamide and/or combinations or derivatives.

The high temperature polymeric materials of the present invention comprise corona resistant composite filler in an amount within a range between (and including) any two of the following weight percentages: 2, 3, 4, 5, 6, 7, 8, 9, 10, 12, 15, 18, 20, 24, 25, 28, 30, 32, 34, 35, 36, 38, 40, 42, 44, 46, 48, and 50 weight percent.

The corona resistant composite fillers of the present invention have an average size (dispersed within the polymeric material) in a range between (and including) any two of the following sizes: 5, 10, 15, 20, 25, 30, 35, 40, 45, 50, 55, 60, 65, 70, 75, 80, 85, 90, 95, 100, 125, 150, 175, 200, 250, 300, 350, 400, 450, and 500 nanometers, where at least 80, 85, 90, 92, 94, 95, 96, 98, 99 or 100 percent of the dispersed composite filler is within the above defined size range(s).

The corona resistant composite filler of the present invention comprises a ceramic oxide component, such as alumina, silica or titania, and an organic component, where at least a portion of the interface between the two components comprises an organo-siloxane, organo-metaloxane (e.g., organozirconate, organotitanate, organoaluminate) or similar type moiety.

The organic component is selected according to the particular solvent system selected for dispersing the composite filler into the high temperature polymeric material (or precursor thereto). In one or more steps, the high temperature polymeric material (or precursor thereto) is solvated to a sufficiently low viscosity (typically, a viscosity of less than 20, 15, 10, 9, 8, 7, 6, 5, 4, 3, 2, 1.5, 1 or 0.5 kiloPoise) to allow the composite filler (also suspendable in the solvent system concurrently or in a subsequent step or steps) to be dispersed within the polymer or polymer precursor without undue agglomeration, interfacial voids or other problems that have often been associated with inorganic particle composite fillers dispersed in high temperature polymeric materials. The resulting filled polymeric material has been found to have extraordinary corona resistance, without unduly harming (and in some instances actually improving) mechanical properties.

The corona resistant high temperature polymeric materials of the present invention can be suitable for wire insulation in high voltage applications. For example, wire insulated with the corona resistant compositions of the present invention can be used in combination with (or as an integral part of) rotors, stators or the like found in large industrial dynamo-electric machinery or the like.

DETAILED DESCRIPTION OF THE PREFERRED EMBODIMENT(S)

Overview. The compositions of the present invention comprise: i. a high temperature polymeric matrix and ii. a composite, corona resistant composite filler. These components will be described individually, then in combination.

High Temperature Polymeric Matrix. Useful high temperature polymeric matrices of the present invention include as a dominant component (i.e., at least 50, 60, 70, 75, 80, 85, 90, 95, 96, 97, 98, 99 or 100 weight percent) a polymer having one or more of the following moieties: amide, imide, ether, sulfone, epoxy, carbonate, ester. Preferred high temperature polymeric matrix polymers include:
1. polyimide,
2. polyester,
3. polyesteramide,
4. polyesteramideimide,
5. polyamide,
6. polyamideimide,
7. polyetherimide,
8. polycarbonate,
9. polysulfone,
10. polyether,
11. polyetherketone,
12. polyethersulfone,
13. polyphthalamide,
14. epoxy resins,
15. and the like, including derivations and combinations thereof.

In one embodiment, the polymeric matrix is a thermoset polyimide, such as a KAPTON® brand polyimide available from E.I. du Pont de Nemours and Company of Wilmington, Del., USA. As used herein, the term 'thermoplastic' polyimide is intended to mean a polyimide composition where the glass transition temperature of the material is less than 375, 350, 325 or 300° C. Conversely 'thermoset' polyimides are intended to include polyimide compositions where the glass transition temperature is equal to or greater than the above defined (upper limit) glass transition of a thermoplastic polyimide, or otherwise where the polyimide does not have a measurable glass transition temperature.

In one embodiment of the present invention, the polymeric binder is a polyimide synthesized by first forming a polyimide precursor (a polyamic acid solution) created by reacting (in a solvent system) one or more dianhydride monomers with one or more diamine monomers. So long as the corona resistant composite filler is sufficiently dispersible in the polyamic acid solution, the composite filler can be dispersed prior to, during, or after the polyamic acid solution is created, at least until polymerization, imidization, solvent removal or other subsequent processing increases viscosity beyond what is needed to disperse the composite filler within the material. Ultimately the precursor (polyamic acid) is converted into a high temperature polyimide material having a solids content of greater than 99.5 weight percent, and at some point in this process, the viscosity is increased beyond what is necessary to intermix the composite filler into the polyimide or polyimide precursor. Depending upon the particular embodiment chosen, the viscosity could possibly be lowered again by solvating the material, perhaps sufficient to allow dispersion of the composite filler into the material.

In one embodiment, the polyamic acid solution is formed from one or more aromatic and/or aliphatic diamine monomers and one or more aromatic and/or aliphatic dianhydride monomers. In an alternate embodiment the dianhydride and diamine monomers are both aromatic, optionally also including an aliphatic diamine.

Polyamic acid solutions can be converted to high temperature polyimides using processes and techniques commonly known in the art, such as heat and/or conventional polyimide conversion chemistry. Such polyimide manufacturing processes have been practiced for decades, and the amount of public literature on polyimide manufacture is legion, and hence further discussion here is unnecessary. Any conventional or non-conventional polyimide manufacturing processes are appropriate for use in accordance with the present invention, provided a precursor material is available of sufficiently low viscosity to allow composite filler particles of the present invention to be mixed therein.

As used herein, an "aromatic" monomer is either a diamine or a dianhydride having at least one aromatic ring, either alone (i.e., a substituted or unsubstituted, functionalized or unfunctionalized benzene or similar-type aromatic ring) or connected to another (aromatic or aliphatic) ring.

The term "diamine monomer" as used herein is intended to mean a monomer that reacts with (is complimentary to) a dianhydride monomer to form an intermediate polyamic acid. The polyamic acid is then cured, typically under heat, to form a polyimide.

Depending upon the context, the term diamine monomer can mean (i.) an unreacted monomer (i.e., a diamine monomer); (ii.) a partially reacted monomer (i.e., an oligomer or other polyimide precursor having amine functionality, whereby the precursor is derived in part from diamine monomer) or (iii.) a diamine portion of a fully reacted polymer (the portion or portions of the polyimide attributable to the diamine monomer). The diamine monomer can be functionalized with one or more moieties, depending upon the particular embodiment selected in the practice of the present invention.

Indeed, the term "diamine" is not intended to be limiting (or interpreted literally) as to the number of amine moieties in the diamine monomer. For example, (ii.) and (iii.) above include polymeric materials that may have two, one, or zero amine moieties. Alternatively, the diamine monomer may be functionalized with additional amine moieties (in addition to the amine moieties that react with a dianhydride to provide a polyimide chain). Such additional amine moieties could be used to crosslink the polymer or to provide other functionality to the polymer.

Similarly, the term 'dianhydride monomer' as used herein is intended to mean the monomer that reacts with (is complimentary to) the diamine monomer to form a polyamic acid, and then upon curing with heat and/or radiation, a polyimide.

Depending upon the context it is used, "anhydride" as used herein can mean not only an anhydride moiety per se, but also a precursor to an anhydride moiety, such as: (i.) a pair of carboxylic acid groups (which can be converted to anhydride by a dehydration or similar-type reaction); or (ii.) an acid—acid ester functionality (or any other functionality presently known or developed in the future which is) capable of conversion to anhydride functionality.

Depending upon context, "dianhydride" can mean: (i) the unreacted form (i.e., a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polyimide composition reacted from or otherwise attributable to dianhydride monomer) or (iii) a fully reacted form (the portion or portions of the polyimide derived from or otherwise attributable to dianhydride monomer).

The dianhydride monomer can be functionalized with one or more moieties, depending upon the particular embodiment selected in the practice of the present invention. Indeed, the term "dianhydride" is not intended to be limiting (or interpreted literally) as to the number of anhydride moieties in the dianhydride monomer. For example, (i.), (ii.) and (iii.) (in the paragraph above) include organic substances that may have one or zero anhydride moieties, depending upon whether the anhydride is in a precursor state or a reacted state. Alternatively, the dianhydride monomer may be functionalized with additional anhydride type moieties (in addition to the anhydride moieties that react with diamine to provide a polyimide). Such additional anhydride moieties could be used to crosslink the polymer or to provide other functionality to the polymer.

Examples of useful dianhydride monomers in the present invention include pyromellitic dianhydride (PMDA); 3,3',4,4'-biphenyl tetracarboxylic dianhydride (BPDA); 3,3',4,4'-benzophenone tetracarboxylic dianhydride (BTDA); 4,4'-oxydiphthalic dianhydride (ODPA); bis(3,4-dicarboxyphenyl) sulfoxide dianhydride (DSDA); 1,1,1,3,3,3,-hexafluoropropane dianhydride (6FDA); bisphenol A dianhydride (BPADA); 2,3,6,7-naphthalene tetracarboxylic dianhydride; 1,2,5,6-naphthalene tetracarboxylic dianhydride; 1,4,5,8-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,2'-bis(trifluoromethylbenzidine); 2,3,3',4'-biphenyl tetracarboxylic dianhydride; 2,2',3,3'-biphenyl tetracarboxylic dianhydride; 2,3,3',4'-benzophenone tetracarboxylic dianhydride; 2,2',3,3'-benzophenone tetracarboxylic dianhydride; 2,2-bis(3,4-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; 4,4'-(hexafluoroisopropylidene) diphthalic anhydride; bis(3,4-dicarboxyphenyl) sulfone dianhydride; tetrahydrofuran-2,3,4,5-tetracarboxylic dianhydride; pyrazine-2,3,5,6-tetracarboxylic dianhydride; thiophene-2,3,4,5-tetracarboxylic dianhydride; phenanthrene-1,8,9,10-tetracarboxylic dianhydride; perylene-3,4,9,10-tetracarboxylic dianhydride; bis-1,3-isobenzofurandione; bis (3,4-dicarboxyphenyl) thioether dianhydride; bicyclo-[2,2,2]-octen-(7)-2,3,5,6-tetracarboxylic-2,3,5,6-dianhydride; 2-(3',4'-dicarboxyphenyl) 5,6-dicarboxybenzimidazole dianhydride; 2-(3',4'-dicarboxyphenyl) 5,6-dicarboxybenzoxazole dianhydride; 2-(3',4'-dicarboxyphenyl) 5,6-dicarboxybenzothiazole dianhydride; bis (3,4-dicarboxyphenyl) 2,5-oxadiazole 1,3,4-dianhydride; bis 2,5-(3',4'-dicarboxydiphenylether) 1,3,4-oxadiazole dianhydride; their acid ester and their acid chloride derivatives. Pyromellitic dianhydride (PMDA) is preferred.

Examples of suitable diamine monomers include: 2,2 bis-(4-aminophenyl) propane; 4,4'-diaminodiphenyl methane; 4,4'-diaminodiphenyl sulfide; 3,3'-diaminodiphenyl sulfone; 4,4'-diaminodiphenyl sulfone; 4,4'-diaminodiphenyl ether (4,4'-ODA); 3,4'-diaminodiphenyl ether (3,4-ODA); 1,3-bis-(4-aminophenoxy) benzene (APB-134); 1,3-bis-(3-aminophenoxy) benzene (APB-133); 1,2-bis-(4-aminophenoxy) benzene; 1,2-bis-(3-aminophenoxy) benzene; 1,4-bis-(4-aminophenoxy) benzene; 1,4-bis-(3-aminophenoxy) benzene; 1,5-diaminonaphthalene; 4,4'-diaminodiphenyldiethylsilane; 4,4'-diaminodiphenylsilane; 4,4'-diaminodiphenylethylphosphine oxide; 4,4'-diaminodiphenyl-N-methyl amine; 4,4'-diaminodiphenyl-N-phenyl amine; 1,2-diaminobenzene (OPD); 1,3-diaminobenzene (MPD); 1,4-diaminobenzene (PPD); 2,5-dimethyl-1,4-diaminobenzene; 2,5-dimethyl-1,4-phenylenediamine (DPX); trifluoromethyl-2,4-diaminobenzene; trifluoromethyl-3,5-diaminobenzene; 2,2-bis(4-aminophenyl) 1,1,1,3,3,3-hexafluoropropane; 2,2-bis(3-aminophenyl) 1,1,1,3,3,3-hexafluoropropane; benzidine; 4,4'-diaminobenzophenone; 3,4'-diaminobenzophenone; 3,3'-diaminobenzophenone; m-xylylene diamine; p-xylylene diamine; bisaminophenoxyphenylsulfone; 4,4'-isopropylidenedianiline; N,N-bis-(4-aminophenyl) methylamine; N,N-bis-(4-aminophenyl) aniline; 3,3'-dimethyl-4,4'-diaminobiphenyl; 4-aminophenyl-3-aminobenzoate; 2,4-diaminotoluene; 2,5-diaminotoluene; 2,6-diaminotoluene; 2,4-diamine-5-chlorotoluene; 2,4-diamine-6-chlorotoluene; 2,4-bis-(beta-amino-t-butyl) toluene; bis-(p-beta-amino-t-butyl phenyl) ether; p-bis-2-(2-methyl-4-aminopentyl) benzene; 1-(4-aminophenoxy)-3-(3-aminophenoxy) benzene; 1-(4-aminophenoxy)-4-(3 -aminophenoxy) benzene; 2,2-bis-[4-(4-aminophenoxy)phenyl] propane (BAPP); 2,2'-bis-(4-aminophenyl)-hexafluoro propane (6F diamine); 2,2'-bis-(4-phenoxy aniline) isopropylidene; 2,4,6-trimethyl-1,3-diaminobenzene; 4,4'-diamino-2,2'-trifluoromethyl diphenyloxide; 3,3'-diamino-5,5'-trifluoromethyl diphenyloxide; 2,2'-trifluoromethyl-4,4'-diaminobiphenyl; 4,4'-oxybis-[(2-trifluoromethyl) benzene amine]; 4,4'-oxy-bis-[(3-trifluoromethyl) benzene amine]; 4,4'-thio-bis-[(2-trifluoromethyl) benzene-amine]; 4,4'-thiobis-[(3-trifluoromethyl) benzene amine]; 4,4'-sulfoxyl-bis-[(2-trifluoromethyl) benzene amine; 4,4'-sulfoxyl-bis-[(3-trifluoromethyl) benzene amine]; and 4,4'-keto-bis-[(2-trifluoromethyl) benzene amine]. 4,4'-oxydianiline (4,4-ODA) is preferred.

Aliphatic diamines are also useful diamine monomers and are used to make the polyamic acid precursors (and then the polyimides) of the present invention. Useful aliphatic diamines are 1,4-tetramethylenediamine, 1,5-pentamethylenediamine (PMD), 1,6-hexamethylenediamine (HMD), 1,7-heptamethylene diamine, 1,8-octamethylenediamine, 1,9-nonamethylenediamine, 1,10-decamethylenediamine (DMD), 1,11-undecamethylenediamine, 1,12-dodecamethylenediamine (DDD), 1,16-hexadecamethylenediamine. The preferred aliphatic diamine is 1,6-hexamethylene diamine (HMD). 1,6-hexamethylene diamine (HMD) is preferred.

In an alternative embodiment, an epoxy resin is used as the high temperature polymer matrix. In one embodiment, the epoxy resin is derived from bisphenol-A diglycidyl ether, epoxy novolac resins, cycloaliphatic epoxy resins, diglycidyl ester resins, glycidyl ethers of polyphenols or the like. These resins preferably have an epoxy equivalent weight average molecular weight of about 130–1500. Such resins are well known in the art and are described in U.S. Pat. Nos. 2,324,483; 2,444,333; 2,494,295; 2,500,600; and 2,511,913.

Catalytic hardeners, or curing agents for the above mentioned epoxy resins include aluminum acetylacetonate, aluminum di-sec-butoxide acetoacetic ester chelate or tetraoctylene glycol titanate in combination with phenolic accelerators, including resorcinol, catechol or hydroquinone and the corresponding dihydroxynaphthalene compounds. Compositions of this type have been described in U.S. Pat. Nos. 3,776,978 and 3,812,214.

Corona Resistant, Composite Filler: Overview. The preferred corona resistant composite filler of the present invention has an average size (dispersed within the polymeric material) in a range between (and including) any two of the following sizes: 5, 10, 15, 20, 25, 30, 35, 40, 45, 50, 55, 60, 65, 70, 75, 80, 85, 90, 95 and 100, 125, 150, 175, 200, 250, 300, 350, 400, 450, and 500 nanometers, where at least 80, 85, 90, 92, 94, 95, 96, 98, 99 or 100 percent of the dispersed composite filler is within the above size range(s). Composite filler size can be determined by a laser particle analyzer, such as, a "PAR III" brand laser particle analyzer available from Otsuka Electronics, Company, Ltd. of Japan.

In some embodiments, if the mean particle size is smaller than 20 nanometers, the composite filler particles will tend to agglomerate, and if the mean particle size exceeds 500 nanometers, the dispersion of composite filler may be unstable, thereby risking a non-homogeneous dispersion of composite filler within the high temperature polymer matrix.

In accordance with the present invention, the organic component of the composite filler material is chosen primarily to provide or improve dispensability of the composite filler material into a particular solvated polymer matrix or polymer matrix precursor. Generally speaking, an organic component of similar polarity (to a selected solvent) and of relatively low molecular weight will more readily disperse in the solvent than otherwise. Hence the organic component of the present invention is selected in view of the particular solvent system into which the composite filler is intended to be dispersed or otherwise intermixed.

Similarly, the inorganic component of the composite filler is selected primarily to provide or improve corona resistance. Since alumina is a widely accepted corona resistant inorganic ceramic oxide, it is particularly mentioned herein, but the industry may prefer or otherwise adopt other types of corona resistant inorganic ceramic oxides, and hence the inorganic component of the present invention is intended to be broadly defined.

While not intending to be bound by a particular theory, in at least one embodiment it is believed that the organic component lowers the surface energy of the inorganic component and thus allows it to be easily dispersible in organic solvents. Because the composite fillers of the present invention are more readily dispersible, often with little to no additional shearing force or filtration required, these slurries often form fewer, perhaps no (or essentially no, i.e., less than 100, 50, 20, 10, 8, 6, 5, 4, 3, 2, or 1 parts per million or "ppm"), highly undesired agglomerates in the size range of greater than 0.5, 0.6, 0.7, 0.8, 0.9, 1.0, 2.0, 3.0, 4.0, 5.0, 6.0, 7.0, 8.0, 9.0, or 10 microns. Hence, the compositions of the present invention can be used to form films having highly improved dielectric strength and/or highly improved mechanical film properties.

Furthermore in some embodiments, it has been surprisingly discovered that films in accordance with the present invention often have higher dielectric strength than films made without inorganic ceramic oxide particles incorporated into the polymer (i.e., pure polyimide polymer without metal oxide or silica filler). Although not intending to be bound to any particular theory, it is theorized that the composite fillers of the present invention provide such an efficient dispersion of non-agglomerated small particles within the polymer matrix that the composite fillers of the present invention may be capable of diluting electric charge along a film's x-y plane, at least to a greater extent than is observed with unfilled, pure polymer (and also to a greater extent than conventional poorly dispersed, more highly aggregated ceramic oxide fillers), perhaps thereby improving electrical resistance in the z direction.

Typically, the composite fillers of the present invention generally do not require extensive milling and filtration to breakup unwanted particle agglomeration as is typical when attempting to disperse nano-sized conventional ceramic oxide fillers into a polymer matrix. Such milling and filtration can be costly and may not be capable of removing all unwanted agglomerates.

Indeed in one embodiment, the composite filler is dispersible and suspendible at 20 weight percent in a (at least 99 weight percent pure) dimethylacetamide solvent and after dispersing and suspending the filler into the solvent with a high shear mechanical force, less than 15, 10, 8, 6, 4, 2 or 1 weight percent of the filler precipitates out of solution when kept at rest at 20° C. for 72 hours.

Composite, Corona Resistant Composite filler: Ceramic Oxide Component. The composite fillers of the present invention have an inorganic ceramic oxide component, such as, ceramic oxides of Al, V, Cr, Mn, Fe, Co, Ni, Cu, Zn, Ge, Zr, Nb, Mo, Sn, Sb, Ta, W, Pb or Ce. In some embodiments, the ceramic oxide component is silica, alumina, titania, and/or zirconia. In some embodiments, the inorganic ceramic oxide component comprises silica and/or alumina. In some embodiments, the inorganic ceramic oxide component comprises alumina.

The inorganic ceramic oxide component is selected primarily to provide or enhance corona resistance, and other aspects of the inorganic ceramic oxide component are not unduly important, such as, impurity levels, crystalline structures, degree of hydration (if any), manufacturing technique (whether by heat, e.g., fuming or other refractory heating, by plasma, by colloidal precipitation, or by other conventional or non-conventional method for manufacturing an inorganic ceramic oxide).

The inorganic component may be prepared by ceramic oxide growth in an aqueous alkali solution, or by polycondensation of a metal (or silicon) alkoxide, or by a gas phase method. Such methods are in the public literature and conventionally known. Broadly speaking, however, many, if not all, the inorganic ceramic oxides useful in accordance with the present invention are available from commercial suppliers of such particles, either as commercial products or by custom order, presumably at a quality and cost lower than could otherwise be achieved.

The composite filler composition is hereby further defined as having a weight ratio of A:B, where A represents the organic portion of the composite filler and B represents the inorganic portion of the composite filler or A:B, and where A is 1 and B is a range between and including any of the following numbers: 0.01, 0.05, 0.1, 0.2, 0.3, 0.4, 0.5, 0.6, 0.7, 0.8, 0.9, 1.0, 1.2, 1.5, 1.7, 2.0, 3.0, 4.0, 5.0, 6.0, 7.0, 8.0, 9.0 and 10. At higher relative amounts of inorganic component (where B is greater than about 10) composite filler loadings may become unduly high to achieve desired levels of corona resistance and such high levels of loadings can be difficult to achieve and can be detrimental to mechanical properties of the final (filled) high temperature polymeric material. At lower relative amounts of inorganic filler (where B is less than 0.01), the composite filler can be difficult to disperse within the polymer matrix. Ordinary skill and experimentation may be necessary in practicing any particular embodiment of the present invention.

Composite, Corona Resistant Filler: Organic Component. The organic component of the corona resistant composite filler of the present invention can be polymerization (by conventional or non-conventional techniques) using virtually any monomer, depending upon the embodiment selected. The organic component is often, at least in part, the organic portion of a (organic-inorganic) coupling agent reacted to the inorganic component. In selecting the organic component, proper attention should be given to matching the dispensability of the organic component with the particular solvent chosen for the particular high temperature polymer matrix selected.

Generally speaking, the organic component is more readily dispersible in a solvent, the more similar the polarity (or non-polarity) of the organic component with respect to the solvent; furthermore, the lower the molecular weight, generally speaking, the greater the dispensability of the organic component. Hence, the organic component should be selected in a way that optimizes the polarity of the composite filler with the polarity of the solvent, while also minimizing the surplus amount of organic component (that does little to further compatibalize polarity while thereby unduly adding bulk that is detrimental to dispensability). Ordinary skill and experimentation may be necessary in optimizing the organic component for any particular solvent system selected.

Potentially useful monomers include:
1. unsaturated aromatic compounds such as styrene, alpha-methylstyrene, halogenated styrene and divinylbenzene;
2. unsaturated esters such as vinyl acetate and vinyl propionate;
3. unsaturated nitriles, such as, acrylonitrile;
4. acrylic acid esters or methacrylic acid esters, such as methyl acrylate, methyl methacrylate, ethyl acrylate, ethyl methacrylate, 2-ethylhexyl acrylate, 2-ethylhexyl methacrylate, lauryl acrylate, lauryl methacrylate, ethyleneglycol diacrylate, ethyleneglycol dimethacrylate, glycidyl acrylate, glycidyl methacrylate, 2-hydroxyethyl acrylate, acryl acrylate and allyl methacrylate;
5. $C_2$–$C_{20}$ alkene or vinyl monomers, such as ethylene, propylene, butylene, butadiene, isoprene, and the like;

6. acrylic acid, methacrylic acid, and derivations thereof;
7. acrylamide, methacrylamide, N-methylolacrylamide, N-methylolmethacrylamide, and the like;
8. monomers having one or more polymerizable reactive sites, such as, hydroxyl, epoxy, carboxyl, anhydride, amino, halide, and the like; and
9. combinations and derivations thereof.

However, the organic component must be functionalized or otherwise capable of being bonded to the inorganic ceramic oxide component of the composite filler by means of an organo-siloxane (and less preferably, an organo-metaloxane) moiety. This can be done by functionalizing the organic component with a functional group capable of reacting with the inorganic ceramic oxide component in a way that produces a siloxane (or metaloxane) linkage between the two components. For example, the organic component can be functionalized with a —Si($R_1$, $R_2$, $R_3$), where:

1. —Si—$R_1$,
2. —Si—$R_2$, and
3. —Si—$R_3$ are the same or different and at least one of which is further defined as being —SiOR, where R is either:
   1. hydrogen (i.e., —SiOR is —SiOH); or
   2. a substituted or unsubstituted alkyl capable of undergoing hydrolysis to convert the —OR to —OH, (i.e., SiOR is a precursor to —SiOH, that is converted to SiOH upon hydrolysis).

In this embodiment, the —SiOH functionalized organic component can be reacted to the inorganic component, bonding the organic and inorganic components together and thereby forming a —Si—O—X— bond at the interface of the two components, where X is an atom of the inorganic component that is either Si or a metal, depending upon the particular inorganic component selected.

The forming of an organo-siloxane (or organo-metaloxane) bond at the interface of the two composite filler components can also be done by functionalizing the inorganic component with an R'—Si—O—X moiety (or R'—M—O—X— moiety), where X is an atom of (and covalently bonded with and to) the inorganic component and is either Si or a metal, depending upon the particular inorganic component selected, and where R' is an organic moiety that is either the entire organic component or a portion of the organic component that is then reacted with one or more additional organic reactants to form the organic component.

In one embodiment, the organosiloxane bond between the organic and inorganic components of the composite filler can be accomplished by using an organo-silane coupling agent, where the silane group of the coupling agent bonds (forming a siloxane linkage) to the inorganic component and the organo portion of the coupling agent is selected to bond to the organic component. Useful such coupling agents may include:

(a) vinyltrichlorsilane, vinyltris(.beta.-methoxyethoxy)silane, vinyltriethoxysilane, vinyltrimethoxysilane, gamma-methacryloxypropyltrimethoxysilane, gamma-mercaptopropyltrimethoxysilane and gamma-chloropropyltrimethoxysilane;
(b) gamma-glycidoxypropyltrimethoxysilane and gamma-glycidoxypropylmethyldiethoxysilane; and
(c) N-beta(aminoethyl).gamma.-aminopropyltrimethoxysilane, N-(beta(aminoethyl) gamma-aminopropylmethyldimethoxysilane and gamma-aminopropyltriethoxysilane.

The silane coupling agents of the present invention preferably have functional groups that can easily react with the organic component functional groups. For example, for organic components having carboxyl groups introduced therein, the silane coupling agents of (b) and (c) above with epoxy groups and amino groups are preferred. Among these, gamma-glycidoxypropyltrimethoxysilane and N-(beta-(aminoethyl) gamma-aminopropyltrimethoxysilane are particularly preferred.

A less preferred by alternative coupling agents include organo-metaloxane coupling agents, such as, acetoalkoxyaluminum diisopropylate and the like, and isopropyl triisostearoyltitanate, isopropyltridecyl benzenesulfonyltitanate, and the like. Different coupling agents may be used alone or in combinations of two or more, and coupling agents of different types may also be used together.

In one embodiment, the organo portion of the coupling agent is all or part of the organic component of the composite filler. If a commercial or otherwise available coupling agent can be found having a suitable organo portion offering excellent dispensability with respect to a particular, desired solvent system, the organic component of the composite filler is generally preferably obtained by means of the coupling agent. In such circumstances (or otherwise) a sophisticated inorganic particle supplier, such as DeGussa AG of Germany, may be able to custom manufacture a suitable inorganic/organic composite filler (bonded with an organo-siloxane or organo-metaloxane) in accordance with the present invention.

Otherwise, the bonding of each coupling agent to a separate organic component can be accomplished by dispersing the coupling agent in a dispersion containing the organic component and the inorganic component. Depending upon the particular embodiment of the present invention chosen, suitable solvent systems can include water, organic solvents and water in combination with (water miscible) organic solvents, such as many alcohols. Incompatible (or multi-phase) solvent systems may also be useful, depending upon the particular embodiment selected, provided sufficient agitation or mixing is provided to allow reaction between the coupling agent and both the organic and inorganic component of the composite filler. When water is included in the dispersion medium, it is preferred to introduce hydrophilic functional groups such as hydroxyl groups, epoxy groups or carboxylic groups into the organic component in order to stabilize the organic component in the dispersion system and achieve uniform dispersion. Introduction of these functional groups can also promote easier chemical bonding and/or non-chemical bonding of the coupling agent(s). Preferred alcohols for such use include lower saturated aliphatic alcohols such as methanol, ethanol, 1-propanol, 2-propanol, 1-butanol, 2-butanol, tert-butanol and the like. These alcohols can be used alone or in combinations of two or more. Other organic solvents besides alcohol, such as methyl ethyl ketone and dimethylformamide may be used, and these organic solvents, water and alcohol may also be used in combination in appropriate weight ratios.

In the above described reaction to create the composite filler, the organic component content in the dispersion medium is preferably 0.0001–70 wt % (hereunder all percent values will mean weight percent, unless indicated otherwise), more preferably 0.001–50%, and especially 0.01–25%. If the content is under 0.0001%, the composite filler yield can be low, and if it is over 70%, one or more components may fall out of suspension or otherwise dispersion stability can be problematic. Further, the reaction for forming the composite filler can be promoted by heating or using a catalyst. For heating, the reaction system temperature is preferably 40–100 C. As catalysts there may be used acids, bases, aluminum compounds, tin compounds and the like. Acid catalysts and aluminum catalysts are well known for promoting organo-siloxane or organo-metaloxane reactions with inorganic oxide particles.

Incorporating the Composite Filler Into A High Temperature Polyimide Matrix. Polar aprotic solvents are particularly useful in forming polyimides. Hence, the composite fillers of the present invention are preferably designed to readily disperse in polar aprotic solvents, such as, N-methylpyrrolidinone (NMP), dimethylacetamide (DMAc), gamma-butyrolactone, N,N'-dimethyl-formamide (DMF), dimethyl sulfoxide (DMSO), and tetramethyl urea (TMU). In one embodiment, the preferred solvent is dimethylacetamide (DMAc).

Co-solvents can also be used generally at about five to 50 weight percent of the total solvent. Useful co-solvents include xylene, toluene, benzene, diethyleneglycol diethyl ether, 1,2-dimethoxyethane (monoglyme), diethylene glycol dimethyl ether (diglyme), 1,2-bis-(2-methoxyethoxy) ethane (triglyme), bis [2-(2-methoxyethoxy) ethyl)] ether (tetraglyme), bis-(2-methoxyethyl) ether, tetrahydrofuran, "Cellosolve™" (glycol ethyl ether) and "Cellosolve™ acetate" (hydroxyethyl acetate glycol monoacetate).

The corona resistant polyimide films in accordance with the present invention can be produced by combining diamine and dianhydride monomers together, in the presence of a polar aprotic solvent, to form a polyamic acid solution (also called a polyamide acid solution). The dianhydride and diamine monomers are typically combined in a molar ratio of aromatic dianhydride monomer to aromatic diamine monomer of from about 0.90 to 1.10. Molecular weight of the polyamic acid can be adjusted by adjusting the molar ratio of the dianhydride and diamine monomers.

In one embodiment, the polyamic acid solution contains polyamic acid dissolved in a polar aprotic solvent at a concentration in a range between (and including) any two of the following percentages: 5, 10, 12, 15, 20, 25, 27, 30, 40, 45, 50, 55, or 60 (%) percent by weight. In one embodiment, the solvent content of the polyamic acid solution is in a range of from about 10, 12, 14, 16, 18, 20, or 22, to about 24, 26, 28 or 30 weight (%) percent solvent.

In one embodiment, nano-sized composite filler in accordance with the present invention (i.e., alumina oxide particles comprising $C_2$–$C_{12}$ alkyl organic component linked to the alumina via an organo siloxane linkage) are first dispersed in a solvent to form a slurry and then the slurry is dispersed in the polyamic acid precursor solution. The mixture is called a filled polyamic acid casting solution. The concentration of composite filler to polyimide (in the final film) is typically in the range of 5, 10, 15, 20, 25, 30, 35, or 40, to about 45, 50, 55, 60, 65 or 70 (%) percent by weight. As the concentration of the composite filler increases, the corona resistance of the composite polyimide also increases.

The filled polyamic acid casting solution is typically a blend of a pre-formed polyamic acid solution and composite filler to form a slurry, where in at least one embodiment, the composite filler is present in a concentration range from about 1, 3, 5, 7, 9 or 10 weight (%) percent to about 15, 20, 25, 30, 35, 40, 45 or 50 (%) weight percent. In one embodiment, the composite filler is first dispersed in the same polar aprotic solvent used to make the polyamic acid solution (e.g. DMAc). Optionally, a small amount of polyamic acid solution may be added to the composite filler slurry to either increase the viscosity of the slurry, or stabilize the slurry from unwanted particles agglomeration.

In one embodiment, a composite filler slurry is blended with a polyamic acid solution to form the filled polyamic acid casting solution. This blending operation can include high sheer mixing. Preferably, the average particle size of the composite filler in the slurry and the casting solution and final polyimide film is in a range between and including any two of the following sizes: 5, 10, 15, 20, 25, 30, 35, 40, 45, 50, 55, 60, 65, 70, 75, 80, 85, 90, 95, 100, 125, 150, 175, 200, 250, 300, 350, 400, 450, and 500 nanometers. In one embodiment, the average particle size is from 100 to 300 nanometers.

The ratio of polyamic acid to composite filler may be represented by the ratio A:B wherein A is the weight of the polyamic acid polymer and B is the weight of the composite filler. In one embodiment, A is a range between and including any two of the following: 0.1, 0.2, 0.3, 0.4, 0.5, 0.6, 0.7, 0.8, and 0.9 and B is 1. In this embodiment, if A is below 0.1, the films formed will generally be too brittle and may not be sufficiently flexible to form a freestanding, mechanically tough, flexible sheet that can be wrapped upon a conductive wire. Also in this embodiment, if A is above 0.9, the films formed therefrom may not be sufficiently corona resistant.

The polyamic acid casting solution mentioned above can optionally further comprise additional additives, including processing aids (e.g., oligomers), antioxidants, light stabilizers, flame retardant additives, anti-static agents, heat stabilizers, ultraviolet absorbing agents, inorganic fillers or various reinforcing agents. Common inorganic fillers include thermally conductive fillers, like granular metal oxides, and electrically conductive fillers like metals and electrically conductive polymers. Other common inorganic fillers include granular alumina, granular silica, fumed silica, silicon carbide, diamond, clay, boron nitride, aluminum nitride, titanium dioxide, dicalcium phosphate, and fumed metal oxides. Common organic fillers include polyaniline, polythiophene, polypyrrole, polyphenylenevinylene, polydialkylfluorenes, carbon black, and graphite.

In one embodiment, the polyamic acid casting solution is cast, or applied onto, a support such as an endless belt or rotating drum. A wet film then formed by heating the solution to remove some of the solvent. The wet film, sometimes called a 'green' film is converted into a self-supporting film by baking at an appropriate temperature where the solids are from 60, 65, 70, 75, 80, 85, and 90 weight percent. The green film is separated from the support, molecularly oriented tentering with continued thermal and radiation curing, to provide a fully cured polyimide film having a weight percent solids above 98.5%.

Other useful methods for producing polyimide films in accordance with the present invention can be found in U.S. Pat. Nos. 5,166,308 and 5,298,331 and are incorporated by reference into this specification for all teachings therein. Numerous variations are also possible such as:

(a) A method wherein the diamine monomers and dianhydride monomers are preliminarily mixed together and then the mixture is added in portions to a solvent while stirring.

(b) A method wherein a solvent is added to a stirring mixture of diamine and dianhydride monomers (contrary to (a) above).

(c) A method wherein diamines are exclusively dissolved in a solvent and then dianhydrides are added thereto at such a ratio as allowing to control the reaction rate.

(d) A method wherein the dianhydride monomers are exclusively dissolved in a solvent and then amine components are added thereto at such a ratio to allow control of the reaction rate.

(e) A method wherein the diamine monomers and the dianhydride monomers are separately dissolved in solvents and then these solutions are mixed in a reactor.

(f) A method wherein the polyamic acid with excessive amine component and another polyamic acid with excessive anhydride component are preliminarily formed and then reacted with each other in a reactor, particularly in such a way as to create a non-random or block copolymer.

(g) A method wherein a specific portion of the amine components and dianhydride components are first reacted and then residual dianhydride monomer is reacted, or vice versa.

(h) A method wherein the silane coated fumed alumina oxide particles are dispersed in a solvent and then injected into a stream of polyamic acid to form a filled polyamic acid casting solution and then cast to form a green film.

(i.) A method wherein the components are added in part or in whole in any order to either part or whole of the solvent, also where part or all of any component can be added as a solution in part or all of the solvent.

(j) A method of first reacting one of the dianhydride monomers with one of the diamine monomers giving a first polyamic acid, then reacting the other dianhydride monomer with the other amine component to give a second polyamic acid, and then combining the amic acids in any one of a number of ways prior to film formation.

It is preferable to use a heating system having a plurality of heating sections or zones. It is also generally preferable that the maximum heating temperature be controlled to give a maximum air (or nitrogen) temperature of the ovens from about 200 to 600° C., more preferably from 350 to 500° C. By regulating the maximum curing temperature of the green film within the range as defined above, it is possible to obtain a polyimide film that has excellent mechanical strength, adhesive character, and thermal dimensional stability.

Alternatively, heating temperatures can be set to 200–600° C. while varying the heating time. Regarding the curing time, it is preferable that the polyimide films of the present invention be exposed to the maximum heating temperature for about 1, 2, 3, 5, 10, 15, 20, 25, 30, 35, 40, 45 or 50 seconds to about 60, 70, 80, 90, 100, 200, 400, 500, 700, 800, 900, 1000, 1100 or 1200 seconds. The heating temperature may be changed stepwise so as not to wrinkle the film by drying to quickly.

The thickness of the polyimide film may be adjusted depending on the intended purpose of the film or final application specifications. Depending upon the design criteria of any particular embodiment chosen, the film thickness can be in a range between (and including) any two of the following film thicknesses: 8, 10, 15, 20, 25, 30, 35, 40, 45, 50, 60, 80, 100, 125, 150, 175, 200, 300, 400 and 500 microns. In one embodiment, the thickness is from about 12 to about 125 microns and is preferably from 25 to 75 microns.

As used herein, the term 'corona resistant' means a material possessing the physical property of being able to withstand a prolonged electrical plasma attack for a specific period. In the case of a film, corona resistance is typically measured using a film sample of film that is about one thousands of an inch thick (~1.0 mil) or 25 microns. If the 1 mil (25 micron) film is capable of withstanding 750 volts of electricity (applied to the film using a copper probe measuring ¼" in diameter) at 1050 Hz for a period of greater than 200 hours, the film is said to be 'corona resistant.' In one embodiment, the polyimide films of the present invention survived over 1000 hours of corona testing.

As used herein, the term 'dielectric strength' is a term used to describe the amount of voltage a material can withstand in short instance of time. Dielectric strength of one-mil thick, conventional, unfilled (non-corona resistant) polyimide film is typically about 7,800 volts/mil. Conventional corona resistant films generally provide a dielectric strength of about 7,400 volts/mil. In one embodiment, one class of films according to the present invention are defined as having a dielectric strength greater than 7400, 7500, 7600, 7700, 7800, 7900, or 8000 volts/mil.

As used herein, the term 'elongation' is used to describe a film's ability to stretch under physical pulling force without breaking. In an elongation test, a film sample is placed between two holding clamps. The clamps are pulled in opposite directions. The distance the clamps are able to travel before the material breaks determines the amount of mechanical elongation present in the film. A higher elongation in a film allows the film to wrap more easily around an electrical wire in an electrical insulation application. Typical one-mil thick polyimide generally has an elongation of about 90 to 100 percent (%). Typical corona resistant polyimide films, like DuPont KAPTON CR®, generally have a mechanical elongation of about 40–60 percent (%). In one embodiment, one class of corona resistant films according to the present invention have a mechanical elongation of greater than 60, 65 or 70 percent.

In accordance with the present invention, the corona-resistant films herein are used to wrap, or coat, electrical conductors or conductor wires. These films are also used to impregnate laminated electrical insulation, thus providing superior electrical insulating systems. Additionally, multiple strands of conductive wires wrapped with such corona resistant films are wound together to form turns and coils. In these applications and depending upon the particular embodiment selected, corona resistance can be at least 10 times greater than the conventional insulation used for this purpose. Still further, such novel coils have special utility in the construction of transformers and dynamoelectric machine rotor/stators.

EXAMPLE 1

Aluminum oxide particles were coated with octyltrimethoxysilane in a proportion of about 10 parts per 100 parts of alumina. A gas phase coating process was used at a temperature of about 120 degrees C. with a tempering time of about 2 hours. The BET surface area was about 98 $m^2/g$, and the particles had a density of about 45 g/l, a drying loss of about 0.6%, a loss on ignition of about 6.3%, a pH of about 3.7 and a carbon content of about 4%.

A 19 solids weight (%) percent solution of a polyamic acid derived from pyromellitic acid (PMDA) and 4,4'-oxydianiline (4,4'-ODA) was prepared. The viscosity of the polyamic acid was about 1,000 poise at approximately 98% stoichiometry. The polyamic acid was then degassed and allowed to equilibrate for 24 hours.

The silane coated fumed alumina oxide was added to DMAc to form a 10% by weight slurry. The slurry was sheared using a low shearing force for approximately 5 minutes to disperse the particles. The silane surface coated alumina slurry was then added to the degassed polyamic acid solution until a 15% by weight concentration of alumina to polymer was achieved. The viscosity of the mixture was adjusted by adding more dianhydride so that the viscosity was about 1000 poise.

Next, the polyamic acid and alumina mixtures were poured onto a glass plate and dried in a hot oven where the temperature was ramped from 60° C. to 150° C. over 15 minutes. A 70 weight % solids semi-cured green film was produced. The semi-cured film was then cured for 3 minutes in a 300° C. oven to obtain a ~1 mil thick polyimide film having about 99.5% solids. The sample was then tested on a Hypotronics ramping voltage dielectric tester. The average of 20 dielectric tests is listed as EXAMPLE 1 in the Table 1 below.

COMPARATIVE EXAMPLE 1

Polyimide films were produced starting with a 19 solids weight (%) percent solution of a polyamic acid derived from pyromellitic acid (PMDA) and 4,4'-oxydianiline (4,4'-ODA). The viscosity of the polyamic acid was about 1,000 poise at approximately 98% stoichiometry. The polyamic acid was then degassed and allowed to equilibrate for 24 hours.

Next, the polyamic acid was poured onto a glass plate and dried in a temperature ramped oven from 60° C. to 150° C. over 15 minutes to obtain a 70 weight % solids semi-cured green film. The semi-cured film was then cured for 3 minutes in a 300° C. oven to obtain a ~1 mil thick polyimide film having about 99.5% solids. The sample was then tested on a Hypotronics ramping voltage dielectric tester. The average of 20 dielectric tests is listed as COMPARATIVE EXAMPLE 1 in Table 1 below.

TABLE 1

| Film Sample | Dielectric Value | Comments |
| --- | --- | --- |
| EXAMPLE 1 - a 1 mil silane coated fumed alumina polyimide film | 5843 Volts/mil | Treated silane coated fumed alumina has higher dielectric strength than pure polyimide |
| COMPARATIVE EXAMPLE 1 - a 1 mil pure polyimide film containing no electrically conductive filler | 5684 Volts/mil | Pure polyimide standard sample, a blank. |

EXAMPLE 2

A polyimide film was produced using a commercial scale manufacturing line. The polyimide was made using a 19 percent by weight solution of polyamic acid derived from PMDA and 4,4'-ODA. The viscosity of the polyamic acid was about 1,500 poise and the stoichiometry of the polymer was about 98%. A 10% by weight slurry of low sheared, silane coated fumed alumina oxide was added to the polyamic acid. The mixture was sheared to substantial homogeneity and additional dianhydride was added to increase the viscosity of the mixture to about 1500 poise.

The polyamic acid, silane coated fumed alumina oxide mixture was cast onto a belt and thermally cured to about 70% solids by weight. The wet film was cured in a tenter oven at 400° C. to about 99.5% solids by weight. The polyamic acid was converted to a polyimide. The polyimide film was tested on the Hypotronics ramping voltage dielectric tester. The average dielectric strength of about 100 tests is listed in Table 2 below. The mechanical properties of the film are shown in Table 3 below.

COMPARATIVE EXAMPLE 2

A polyimide film was produced using a commercial scale manufacturing line. The polyimide was made using a 19 percent by weight solution of polyamic acid derived from PMDA and 4,4'-ODA. The viscosity of the polyamic acid was about 1,500 poise and the stoichiometry of the polymer was about 98%. The polyamic acid was cast onto a belt and thermally cured to about 70% solids by weight. The wet film was cured in a tenter oven at 400° C. to about 99.5% solids by weight where the polyamic acid was converted to a polyimide. The polyimide film was tested on the Hypotronics ramping voltage dielectric tester. The average dielectric strength of about 100 tests is listed in Table 2 below. The mechanical properties of the film are shown in Table 3 below.

COMPARATIVE EXAMPLE 3

A polyimide film was produced using a commercial scale manufacturing line. The polyimide was made using a 19% by weight solution of polyamic acid derived from PMDA and 4,4'-ODA. The viscosity of the polyamic acid was about 1,500 poise and the stoichiometry of the polymer was about 98%. A 10% by weight slurry of highly sheared, non-surface treated fumed alumina oxide was added to the polyamic acid at the same quantities and concentration as EXAMPLE 2. The mixture was sheared to substantial homogeneity and additional dianhydride was added to increase the viscosity of the mixture to about 1500 poise.

The polyamic acid, non-surface treated fumed alumina oxide mixture was cast onto a belt and thermally cured to about 70% solids by weight. The wet film was cured in a tenter oven at 400° C. to about 99.5% solids by weight. The polyamic acid was converted to a polyimide. The polyimide film was tested on the Hypotronics ramping voltage dielectric tester. The average dielectric strength of about 100 tests is listed in Table 2 below. The mechanical properties of the film are shown in Table 3 below.

TABLE 2

| Film Sample | Dielectric Value | Comments |
| --- | --- | --- |
| Silane Coated Fumed Alumina Oxide and Polyimide Composite film made on Commercial Scale manufacturing Line | 7,954 Volts/mil | 1 mil thick film shows that silane coated fumed metal oxide improves the Dielectric Strength of Polyimide |
| Commercial Polyimide, KAPTON HA ® film with no filler added | 7,788 Volts/mil | 1 mil thick Standard Polyimide |
| Commercial Polyimide, KAPTON CR ® made using non-surface treated Fumed Alumina Oxide particles 1 mil Film | 7,365 Volts/mil | 1 mil thick Standard Corona Resistant polyimide film |

TABLE 3

| Film Sample | Elongation/ Modulus (MD) | Comments |
| --- | --- | --- |
| Silane Coated Fumed Alumina Oxide and Polyimide Composite film made on Commercial Scale manufacturing Line | 76.4/345 | Higher elongation of new corona resistant film will allow film to be wrapped over wire without breaking. |
| Commercial Polyimide, | 50/400 | Low elongation film |

TABLE 3-continued

| Film Sample | Elongation/ Modulus (MD) | Comments |
| --- | --- | --- |
| KAPTON HA ® film with no filler added | | difficult to pull around wires and will break if stretched too far. |
| Commercial Polyimide, KAPTON CR ® made using non-surface treated Fumed Alumina Oxide particles 1 mil Film | 90/320 | Standard polyimide showing high elongation excellent for wire wrap, no corona resist applications. |

What is claimed is:

1. A corona resistant composition comprising:
   A. a polymer matrix comprising at least 50 weight percent of a high temperature polymer, the high temperature polymer having one or more moieties from a group consisting of: amide, imide, ether, sulfone, epoxy, carbonate, and ester;
   B. a corona resistant composite filler:
      i. in an amount, based upon the total weight of the corona resistant composition, in a range between and including any two of the following weight percentages: and 50-weight percent,
      ii. having a mean particle size in a range between and including any two of the following sizes: 5, 10, 15, 20, 25, 30, 35, 40, 45, 50, 55, 60, 65, 70, 75, 80, 85, 90, 95, 100, 125, 150, 175, 200, 250, 300, 350, 400, 450, and 500 nanometers, wherein at least 80, 85, 90, 92, 94, 95, 96, 98, 99 or 100 percent of the dispersed composite filler is within the above defined size range,
      iii. comprising a ceramic oxide component and an organic component, wherein at least a portion of an interface between the two components comprises an organo-siloxane or organo-metaloxane moiety,
   C. wherein the composition is a film having a thickness between any two of the following numbers, 8, 10, 15, 20, 25, 30, 35, 40, 45, 50, 60, 80, 100, 125, 150, 175, 200, 300, 400 and 500 microns, and
   D. wherein the film has a mechanical elongation of greater than 60, 65 or 70 percent.

2. A corona resistant composition in accordance with claim 1, wherein the high temperature polymer is one or more members of the group consisting of:
   i. polyimide,
   ii. polyester,
   iii. polyesteramide,
   iv. polyesteramideimide,
   v. polyamide,
   vi. polyamideimide,
   vii. polyetherimide,
   viii. polycarbonate,
   ix. polysulfone,
   x. polyether,
   xi. polyetherketone,
   xii. polyethersulfone,
   xiii. polyphthalamide, and
   xiv. epoxy resins.

3. A corona resistant composition in accordance with claim 2, wherein the high temperature polymer is a polyimide, polyetherketone, polyethersulfone, polyphthalamide or a combination thereof.

4. A corona resistant composition in accordance with claim 3, wherein the high temperature polymer is a thermoset polyimide.

5. A corona resistant composition in accordance with claim 1, wherein less than 100 ppm of the composite filler is outside a size range of 50 to 500 nanometers.

6. A corona resistant composition in accordance with claim 1, wherein less than 10 ppm of the composite filler is outside a size range of 50 to 500 nanometers.

7. A corona resistant composition in accordance with claim 4, wherein the polyimide is synthesized by:
   A. forming in one or more steps, a solution having a solids content of less than 50 percent by weight, by contacting one or more dianhydrides with one or more diamines in a solvent system;
   B. combining the solution in one or more steps with the corona resistant composite filler and suspending at least a portion of the filler in the solution;
   C. converting the solution to a polyimide film having a solids content of greater than 99.5 weight percent, whereby at least a portion of the filler is dispersed within the solution while the solution has a solids content of less than 99.5 weight percent.

8. A corona resistant composition in accordance with claim 4, wherein the composite filler is dispersible and suspendable at 20 weight percent in a dimethylacetamide solvent and after dispersing and suspending the filler into the solvent with a high shear mechanical force, less than 15, 10, 8, 6, 4, 2 or 1 weight percent of the filler precipitates out of solution when kept at rest at 20° C. for 72 hours.

9. A corona resistant composition in accordance with claim 8, wherein the composite filler is dispersible and suspendable at 20 weight percent in a dimethylacetamide solvent and after dispersing and suspending the filler into the solvent with a high shear mechanical force, less than 2 weight percent of the filler precipitates out of solution when kept at rest at 20° C. for 72 hours.

10. A corona resistant composition in accordance with claim 1, wherein the composite filler has a size distribution where less than 100, 50, 20, 10, 8, 6, 5, 4, 3, 2, or 1 parts per million parts filler is a size in at least one dimension that is greater than 0.5, 0.6, 0.7, 0.8, 0.9, 1.0, 2.0, 3.0, 4.0, 5.0, 6.0, 7.0, 8.0, 9.0, or 10 microns.

11. A corona resistant composition in accordance with claim 1, wherein the composite filler has a weight ratio of A:B, where A represents the organic portion of the composite filler and B represents the inorganic portion of the composite filler, and where A is 1 and B is a range between and including any of the following numbers: 0.01, 0.05, 0.1, 0.2, 0.3, 0.4, 0.5, 0.6, 0.7, 0.8, 0.9, 1.0, 1.2, 1.5, 1.7 2.0, 3.0, 4.0, 5.0, 6.0, 7.0, 8.0, 9.0 and 10.

12. A corona resistant composition in accordance with claim 1, wherein the organic portion of the composite filler is a substituted or unsubstituted $C_2$–$C_{20}$ alkyl bonded to the inorganic component by a siloxane or metaloxane moiety.

13. A corona resistant composition in accordance with claim 1, wherein the composite filler comprises an alumina particle having a $C_2$–$C_{12}$ alkyl organic component linked to the alumina via an organo siloxane linkage.

14. A corona resistant composition in accordance with claim 1, wherein the composite filler consists essentially of an alumina particle having a $C_2$–$C_{12}$ alkyl organic component linked to the alumina via an organo siloxane linkage.

15. A corona resistant composition in accordance with claim 7, wherein an initial ratio of polyamic acid to composite filler is represented by a ratio A:B wherein A is the weight of the polyamic acid polymer and B is the weight of the composite filler, where A is a range between and including any two of the following: 0.1, 0.2, 0.3, 0.4, 0.5, 0.6, 0.7, 0.8, and 0.9 and B is 1.

16. A corona resistant composition in accordance with claim 1, having a dielectric strength greater than 7400, 7500, 7600, 7700, 7800, 7900, or 8000 volts/mil.

17. A corona resistant composition in accordance with claim 1, having a mechanical elongation of greater than 60, 65 or 70 percent.

18. A corona resistant composition in accordance with claim 4, wherein the polyimide is derived at least in part from a diamine and a dianhydride and wherein the diamine is selected from a group consisting of 2,2 bis-(4-aminophenyl) propane, 4,4'-diaminodiphenyl methane, 4,4'-diaminodiphenyl sulfide, 3,3'-diaminodiphenyl sulfone, 4,4'-diaminodiphenyl sulfone, 4,4'-diaminodiphenyl ether (4,4'-ODA), 3,4'-diaminodiphenyl ether (3,4-ODA), 1,3-bis-(4-aminophenoxy) benzene (APB-134), 1,3-bis-(3-aminophenoxy) benzene (APB-133), 1,2-bis-(4-aminophenoxy) benzene, 1,2-bis-(3-aminophenoxy) benzene, 1,4-bis-(4-aminophenoxy) benzene, 1,4-bis-(3-aminophenoxy) benzene, 1,5 diaminonaphthalene, 4,4'-diaminodiphenyldiethylsilane, 4,4'-diaminodiphenylsilane, 4,4'-diaminodiphenylethylphosphine oxide, 4,4'-diaminodiphenyl-N-methyl amine, 4,4'-diaminodiphenyl-N-phenyl amine, 1,2-diaminobenzene (OPD), 1,3-diaminobenzene (MPD), 1,4-diaminobenzene (PPD),2,5-dimethyl-1,4-diaminobenzene, and 2,5-dimethyl-1,4-phenylenediamine (DPX).

19. A corona resistant composition in accordance with claim 4, wherein the polyimide is derived from a diamine and a dianhydride and wherein the dianhydride is selected from a group consisting of pyromellitic dianhydride (PMDA), 3,3',4,4'-biphenyl tetracarboxylic dianhydride (BPDA), 3,3',4,4'-benzophenone tetracarboxylic dianhydride (BTDA), 4,4'-oxydiphthalic dianhydride (ODPA), bis (3,4-dicarboxyphenyl) sulfoxide dianhydride (DSDA), 1,1,1,3,3,3,-hexafluoropropane dianhydride (6FDA), and bisphenol A dianhydride (BPADA).

* * * * *

UNITED STATES PATENT AND TRADEMARK OFFICE
CERTIFICATE OF CORRECTION

PATENT NO. : 7,015,260 B2  Page 1 of 1
APPLICATION NO. : 10/454359
DATED : March 21, 2006
INVENTOR(S) : Paul Arthur Meloni It is certified that error appears in the above-identified patent and that said Letters Patent is hereby corrected as shown below:

On Page 10, Under Column 17, Line 24, Please delete the words "any two of" after the word including.

On Page 10, Under Column 17, Line 25, Please insert the number --40-- before the word and.

Signed and Sealed this

Thirty-first Day of March, 2009

JOHN DOLL
*Acting Director of the United States Patent and Trademark Office*